US005478537A

United States Patent [19]

Laughlin et al.

[11] Patent Number: 5,478,537

[45] **Date of Patent: *Dec. 26, 1995**

[54] DETERGENT DISPENSER FOR USE WITH SOLID CASTING DETERGENT

[75] Inventors: Timothy E. Laughlin, Edina; Robert C. Grant, Eden Prairie, both of Minn.

[73] Assignee: Sunburst Chemicals, Inc., Minneapolis, Minn.

[ * ] Notice: The term of this patent shall not extend beyond the expiration date of Pat. No. 5,342,587.

[21] Appl. No.: 263,796

[22] Filed: Jun. 22, 1994

Related U.S. Application Data

[63] Continuation-in-part of Ser. No. 950,932, Sep. 24, 1992, Pat. No. 5,342,587.

[51] Int. Cl.$^6$ .................................................. B01D 11/02

[52] U.S. Cl. .................... 422/266; 137/268; 137/625.47; 137/861; 137/876; 137/887; 422/261; 422/278; 422/282

[58] Field of Search .................................... 137/268, 876, 137/625.47, 861, 887; 422/261, 266, 278, 282; 134/93; 4/229–232

[56] References Cited

U.S. PATENT DOCUMENTS

| | | | |
|---|---|---|---|
| 2,704,241 | 3/1955 | Gannon | 137/268 |
| 3,012,752 | 12/1961 | Buck . | |
| 3,140,829 | 7/1964 | Rose | 137/268 |
| 3,233,865 | 2/1966 | Panzica et al. | 137/625.47 |
| 3,788,355 | 1/1974 | Wood | 137/625.47 X |
| 5,183,077 | 2/1993 | Keiper | 137/876 X |
| 5,342,587 | 8/1994 | Laughlin et al. | 422/266 |

*Primary Examiner*—Robert J. Warden
*Assistant Examiner*—Krisanne M. Thornton
*Attorney, Agent, or Firm*—Patterson & Keough

[57] ABSTRACT

A detergent dispenser that is coupled to a source of fluid and which has a chemical source in solid cast form. A spray generator is designed to generate a fluid spray bearing on the chemical source, the fluid spray generating a concentrated solution of the chemical. The concentrated solution of the chemical is discharged through a discharge conduit. A single valve controls a flow of fluid from the source of fluid. The valve has an inlet that is operably fluidly coupled to the source of fluid, an outlet that is operably fluidly coupled to the spray generator, and an outlet that is operably fluidly coupled to the discharge conduit. A metering device for selectively metering portions of the flow of fluid to the spray generator and to the discharge conduit is disposed within the valve and selectively fluidly couples the inlet to the outlet that is operably fluidly coupled to the spray generator and to the outlet that is operably fluidly coupled to the discharge conduit. A pressure feedback shutoff system is utilized to ensure that fluid flow to the spray generator is disabled at the time that the flow in the discharge conduit is disabled.

8 Claims, 8 Drawing Sheets

DETERGENT DISPENSER FOR USE WITH SOLID CASTING DETERGENT

This application is a continuation-in-part application of U.S. patent application Ser. No. 07/950,932, filed Sep. 24, 1992, now U.S. Pat. No. 5,342,587, issued Aug. 30, 1994.

TECHNICAL FIELD

The present invention relates to devices for dispensing a detergent solution. In particular, it relates to a detergent dispenser that is utilized with solid cast detergent and provides a ready to use detergent solution, issued as U.S. Pat. No. 5,342,487 on Aug. 30, 1994.

BACKGROUND OF THE INVENTION

There is a need in industry today to provide a detergent solution that is ready to use when mixed and that is made from solid cast detergent. Solid cast detergent is essentially detergent that is in solid form and cast in a preferably pliable, plastic container; it is effectively a bar of soap in a plastic container. Removal is typically done by dissolving the detergent in place in the container with a jet of water.

There are a number of advantages to using solid cast detergent as compared to liquid detergent. The first is safety. Since the detergent is cast inside of a container it is virtually impossible for personnel to come in contact with the detergent until it has been diluted. The U.S. Department of Transportation recognizes such detergent as safe to ship. If there is an accident, there is no liquid spillage to contaminate the ground water in the immediate area. The containers, even if cracked by the accident, retain the detergent and may simply be retrieved.

The concentration that is possible with solid cast detergent provides additional advantages. Such detergent is typically 100% detergent material as opposed to liquid detergent which is between 40% and 5% detergent, with the remainder being water. A single capsule of solid detergent can do the same work as six to seven gallons of typical liquid detergent. A related advantage is the compactness of solid detergents that provides benefits when storing the detergent, shipping detergent, and when handling the detergent. The dramatic reduction in storage space is especially attractive to relatively small commercial establishments such as gas stations and fast food restaurants that have very little space to devote to storing cleaning supplies. Freight costs are also dramatically reduced since the cost of shipping water is eliminated. Other handling costs are also reduced since, for equal cleaning potential, substantially less weight and volume is being handled as compared to liquid detergent.

Another advantage of solid cast detergent is that it has an essentially indefinite shelf life. Very little can occur that can change the character of the product over time.

Solid cast detergents are more environmentally sound than liquid detergents. Studies have shown that "bag-in-a-box" and five gallon pail packaging of liquid detergent actually have approximately four to five ounces of detergent left when the package is considered empty and therefore is discarded. Raw detergent is accordingly dumped into landfills when liquid detergent packages are discarded. Solid cast detergents use approximately one sixth the volume of empty containers as a liquid system of equal cleaning capacity, and solid cast detergent containers are usually thoroughly rinsed of all detergent by water jet action before being discarded or recycled.

A further requirement of detergent dispensers is that the dispenser should preferably provide a ready to use solution. This requirement is a major concern for many commercial establishments. The portion of the labor pool that is utilized for cleaning functions is typically the lower skilled and less educated portion. Training of these employees is difficult and expensive. The fact that the solution is ready to use minimizes the training that is required for proper usage.

Another aspect of the training issue is that the dispenser should have a minimum number of controls and control operations necessary to obtain a bucket of properly mixed detergent solution. Ideally, the turning of a single valve would provide the solution.

Reliability is another desirable characteristic of a detergent dispenser. A minimum number of moving parts should be provided to minimize maintenance. The dispenser should also be small and be capable of being mounted on the wall, since the storage area for cleaning equipment in most commercial establishments is very small.

In the past, liquid detergent dispensers have been available that dispense a ready to use detergent solution. Additionally, solid cast detergent dispensers have been available. Conventional solid cast detergent dispensers, however, dispense concentrated solutions that must then be properly diluted by maintenance personnel.

A use for such detergent dispensers is in the cleansing the floors of food preparation facilities such as packing plants. In such uses, the outlet of the detergent dispenser is connected to a relatively long hose the hose has a manually operable detergent solution nozzle at its end. An operator walks through the facility spraying the detergent and water solution as needed. Such operation involves frequent cycling actuation of the detergent solution nozzle. The detergent dispenser must be responsive to such on and off cycles. In order to prevent overflows of concentrated detergent, the water to the spray nozzle that is directed at the solid cast detergent must be turned off essentially simultaneously with the operator turning off the manually operated detergent solution nozzle.

In certain facilities, including packing plants, there are strict safety regulations that prevent the use of electricity in conjunction with cleaning operations. Accordingly, it would be very useful to be able to shut off the flow to the spray nozzle simultaneously with shutting off the detergent solution nozzle without using electricity.

In view of the foregoing, it would be a decided advantage to have a detergent dispenser that utilizes a solid cast detergent and that can discharge a ready to use concentration of detergent solution.

SUMMARY OF THE INVENTION

The solid cast detergent dispenser in accordance with the present invention meets the above needs. The detergent dispenser hereof is a reliable, easy to use mechanical device capable of being mounted on a wall in a very limited space that dispenses a ready to use detergent solution from a solid cast detergent. Additionally, the present invention utilizes back pressure to shut off the spray nozzle upon deactivation of the detergent solution nozzle, thus avoiding the use of electricity for such actuation.

The disclosed detergent dispenser is adapted for connection to a source of water, such as a conventional sink. The dispenser includes a dispenser bowl adapted to receive the solid cast detergent and includes a water jet disposed in the dispenser bowl to direct a spray of water onto the solid cast detergent. The spray dissolves the detergent to produce a concentrated solution of detergent and water.

The dispenser is connected to the water source at an inlet to a fitting or valve that distributes the water once it is received within the dispenser. The fitting preferably has two outlets. A first nozzle flow conduit is connected at one end to a first one of the outlets from the fitting, and is connected at its opposed end to the water jet in the dispenser bowl. A second concentrate conduit conveys the concentrated solution from the dispenser bowl. A third dilution conduit is connected to the second outlet of the fitting and conveys water from the fitting to a point where the third conduit intercepts the second concentrate conduit. At this point, the water mixes with the concentrated detergent solution, forming a properly diluted detergent solution. The properly diluted detergent solution then flows to a container for ready use by service personnel.

A restricter is disposed in the fitting means for selectively parting the water entering the fitting and directing a first portion of the water to the first outlet and the remaining portion of the water to the second outlet in a desired ratio to obtain the properly diluted detergent solution.

In an alternate embodiment of the present invention, a valve is utilized to split the flow of inlet water as desired. The valve is designed to selectively deliver all the inlet water to the nozzle flow conduit or all the water to the dilution flow conduit or to selectively meter the water in portions distributed to both the nozzle flow conduit and the dilution flow conduit. The valve has a valve stem disposed in a valve body and a semi-circular channel formed in the valve stem designed to selectively open and close ports formed in the valve body to the inlet water and to the nozzle flow conduit and the dilution flow conduit.

In another alternative embodiment, a detergent dispenser is coupled to a source of fluid and has a chemical source that is in solid cast form. A spray generator is designed to generate a fluid spray that bears on the chemical source and generates a concentrated solution of the chemical. The concentrated solution of the chemical is discharged through a discharge conduit. The detergent dispenser includes a pressure feedback system for disabling a flow of fluid from the source of fluid to the spray generator at the same time as the flow of the concentrated solution of the chemical that is being discharged through the discharge conduit is manually disabled.

DETAILED DESCRIPTION OF THE DRAWINGS

Figure 1:
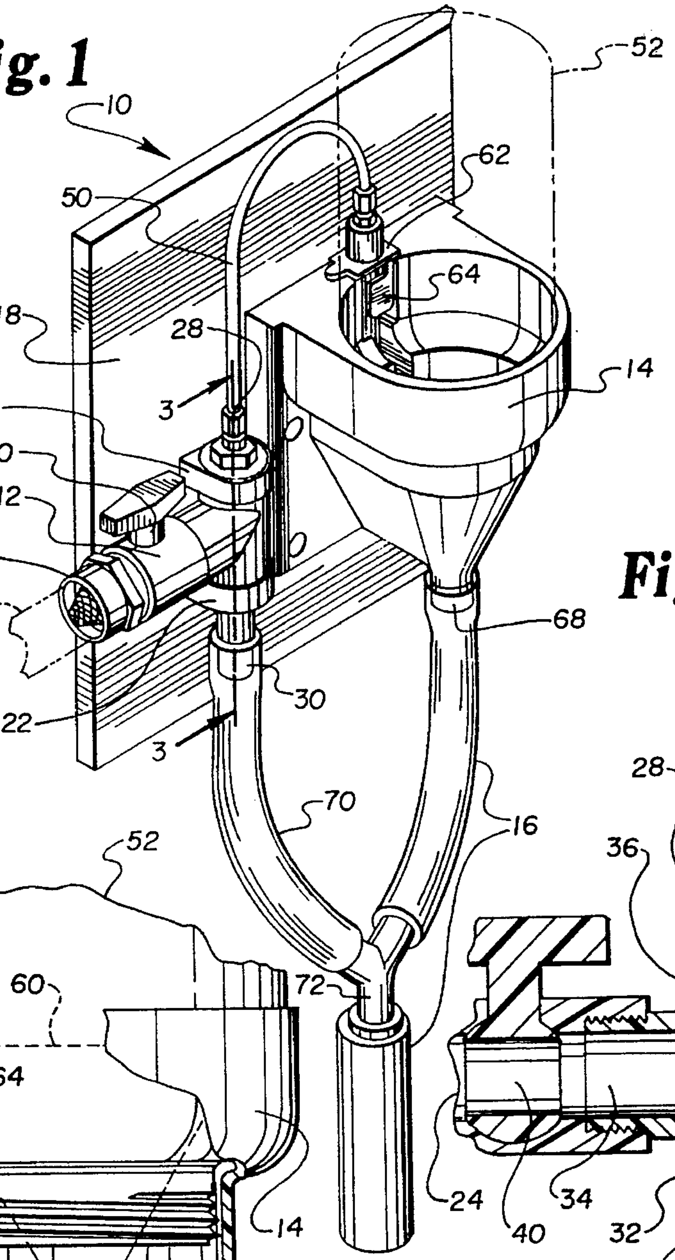
FIG. 1 is a partially schematic, perspective view of a detergent dispenser in accordance with the present invention.

Referring to the drawings, a detergent dispenser 10 in accordance with the present invention broadly includes fitting 12, dispenser bowl 14, and mixing conduit 16. The fitting 12, dispensing bowl 14, and mixing conduit 16 are mounted onto a backing board 18.

Fitting 12 comprises a generally T-shaped fitting. In the preferred embodiment, fitting 12 is constructed of commercially available plastic plumbing material that is cast as desired. The plastic utilized in the construction can be any synthetic resin capable of withstanding the temperatures that are generally found in water that is available at the hot water systems in commercial establishments. Fitting 12 is mounted by clamps 20, 22 to backing board 18. Clamps 20, 22 have interlocking teeth and may be sufficiently tightened by hand pressure in order to facilitate the rapid assembly of dispenser 10.

Fitting 12 has a single inlet, designated at 24. Inlet 24 is connected by conduit 26 (shown in phantom in FIG. 1) to the hot water supply (not shown) of the building in which the detergent dispenser 10 is installed. The inlet of conduit 26 is typically connected to the water spigot of a sink. In the preferred embodiment, a conventional compression fitting (not shown) connects conduit 26 to fitting 12. By tightening nut 27, a slip ring (not shown)that is around conduit 26 is forced against a seat (not shown) within inlet 24. This force tightens the ring around conduit 26, thereby holding conduit 26 in place and creating a water tight seal between inlet 24 and conduit 26.

Fitting 12 includes first and second outlets 28, 30. Interior passageway 32 fluidly connects inlet 24, outlet 28, and outlet 30. Interior passageway 32 is T-shaped, having a first branch 34 in communication with inlet 24, a second branch 36 in communication with outlet 28, and a third branch 38 in communication with outlet 30. First branch 34 includes a valve 40 for selectively closing and opening branch 34 for fluid transmission.

Third branch 38 has a fluid flow restricter 42 disposed in it. The restricter 42 comprises an elastomeric O-ring 44 that is compressively held in branch 38. An elongated tube 46 is compressively held in the central hole in O-ring 42. Orifice 48 passes longitudinally through tube 46. It will be appreciated that an alternative restricter (not shown) may employed in second branch 36 for use in conjunction with restricter 42, or in place of restricter 42.

First outlet 28 is connected to a first end of conduit 50. Connection is preferably by a compression fitting as described above for conduit 26. Conduit 50 is of relatively small diameter tubing in comparison to conduit 26. Conduit 50 is preferably made of pliable plastic tubing.

Dispenser bowl 14 is known in the industry and is typically constructed of a synthetic resin material. Dispenser bowl 14 is adapted to receive inverted detergent container 52, shown in phantom in FIG. 1. Detergent container 52 contains a block of solid cast detergent, and the container 52 is inserted into dispenser bowl 14 with the lid of detergent container 52 removed to expose the detergent block. When in place, detergent container 52 is held with mouth 54 positioned above water jet 56.

Water jet 56 is fluidly connected to fitting 12 by conduit 50. Water jet 56 is designed to emit a spray pattern of water 58 that will impinge upon the solid cast detergent 60 in detergent container 52.

Figure 2:
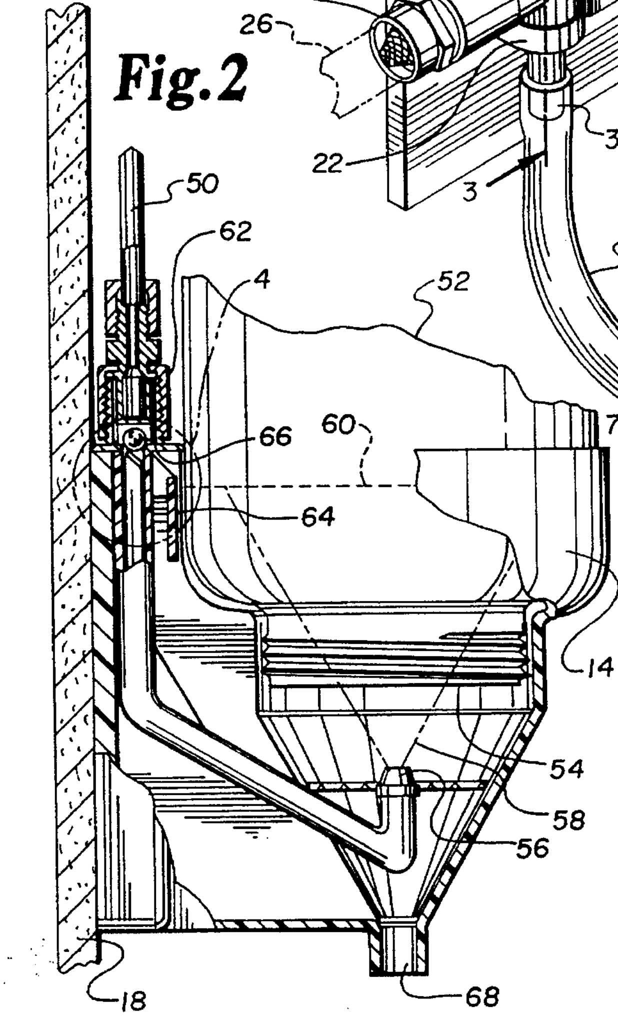
FIG. 2 is a sectional view of the detergent dispenser bowl taken along line 22 in FIG. 1.
Figure 3:
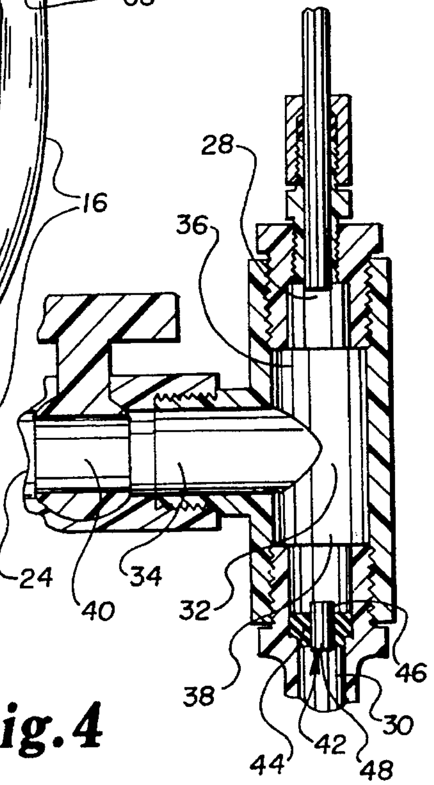
FIG. 3 is a sectional view of the T fitting and valve assembly taken along line 3—3 in FIG. 1.
Figure 4:
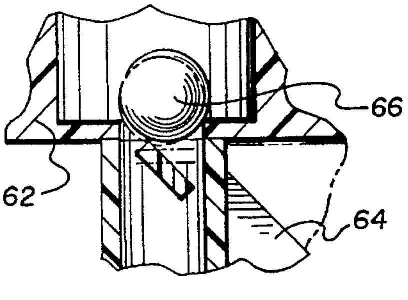
FIG. 4 is an enlarged sectional view of the ball stop in the control housing of the detergent dispenser bowl as shown in the circle labeled 4 in FIG. 2.

Control housing 62 is included in detergent dispenser bowl 14 to selectively control the flow of water to water jet 56. Control is dependent upon the presence of a detergent container 52 within detergent dispenser bowl 14. When a detergent container 52 is in place as shown, paddle switch 64 is in its depressed, open position. In this position, ball stop 66 is in its raised position to admit water to water jet 56. When no detergent container 52 is within detergent dispenser bowl 14, paddle switch 64 swings open and ball stop 66 drops to the position shown in FIGS. 2 and 4, thus sealing off the water from water jet 56.

Dispenser bowl 14 has a gravity drain 68 located in its lowermost portion. Gravity drain 68 is connected to a first end of mixing conduit 16. The second end of mixing conduit 16 is a discharge port for discharging the properly mixed detergent solution. Mixing conduit 16 is preferably of sufficient length such that its discharge end will be comfortably retained in a detergent solution container, such as a bucket, when the container is placed on the floor beneath the detergent dispenser 10.

Conduit 16 is intercepted by a first end of conduit 70. In the embodiment shown, the interception is effected by use of Y-fitting 72. The second end of conduit 70 is connected to the second outlet 30 of fitting 12, thereby fluidly connecting fitting 12 to conduit 16.

In operation, detergent dispenser 10, mounted on backing board 18, is mounted to a wall, usually approximately four feet above the floor with fasteners (not shown) at the four corners of backing board 18.

Conduit 26 is left connected to the water system so that water is continually available at inlet 24. When it is desired to draw a container of detergent solution, the operator need only place a bucket beneath mixing conduit 16 to accept the detergent solution and open the single control valve 40 on the detergent dispenser 10.

Opening valve 40 admits water to interior passageway 32 of fitting 12. The water, under pressure from the tap, floods interior passageway 32. A portion of the water flows to branch 36 and the remaining portion of the water flows to branch 38 of interior passageway 32.

The ratio of water flowing to branches 36, 38 respectively is important to the proper operation of the detergent dispenser 10. This ratio will be better understood after reviewing the full operation of the detergent dispenser 10. At this point it is important to understand that the ratio is effectively controlled by the size of the orifice 48 in restricter 42.

The first portion of water flowing from fitting 12 flows through outlet 28 and into conduit 50. Conduit 50 conveys the water to control housing 62. When paddle switch 64 is depressed by the presence of a detergent container 52, water is supplied to water jet 56. Water jet 56 generates a spray 58 that impinges on the detergent 60 in detergent container 52, dissolving a portion of the detergent 60. A concentrated solution of detergent and water results and flows from the detergent container 52 to the bottom of dispenser bowl 14 at drain 68. From drain 68 the concentrated detergent solution flows into mixing conduit 16.

The second portion of the water flowing through interior passageway 32 of fitting 12, flows through orifice 48 of restricter 42. This portion of the water passes out of outlet 30 and into conduit 70. At the point of interception of mixing of conduit 16, the water in conduit 70 mixes with the concentrated detergent solution flowing in mixing conduit 16. The water from conduit 70 dilutes the detergent solution, resulting in a solution of correct strength flowing from the discharge port of mixing conduit 16. Such detergent solution is ready as it flows into the bucket for use by the operator. To stop the flow of detergent solution, the operator need only close valve 40 shutting off the water supply to water jet 56.

The amount of solid cast detergent 60 that is dissolved by the spray 58 from water jet 56 is a function of several factors, including the pressure and temperature of the water that makes up the spray 58 from water jet 56, and the volume of water that makes up the spray 58. These factors affect the concentration of the solution that flows into mixing conduit 16. The volume of water from conduit 70 that intercepts the concentrated solution flowing in conduit 16 affects the solution strength that flows from mixing conduit 16 into the container. Given that the total volume of water, the pressure of the water, the temperature of the water and the hardness of the water are fixed for a given installation of detergent dispenser 10, the variable that sets the solution concentration parameters of the solution flowing into the container is the size of the orifice 48 in restricter 42.

Orifice 48 determines the ratio of water at the inlet 24 that flows from outlets 28, 30, respectively. It will be appreciated that increasing the flow out of outlet 28 consequently reduces the flow available at outlet 30. Generally, the ratio of total water volume that must be utilized for spray from water jet 56 must be increased to account for the effects of a low total volume of water, low water pressure, low water temperature, and high water hardness. A number of orifice sizes are provided to match the detergent dispenser 10 to the water conditions of the particular installation through the use of alternate restricters 42 having different size orifices. The size of the restricter orifice 48 is typically set by the technician at the time of installation of the detergent dispenser 10 in order to ensure that the proper solution is always available for ready use by the operator.

Although the drawings depict a restricter 42 disposed only in branch 38 of interior passageway 32, it may be desirable in some installations to complement restricter 42 with a second restricter disposed in branch 36 or to employ a restricter only in branch 36 of interior passageway 32.

Figure 5:
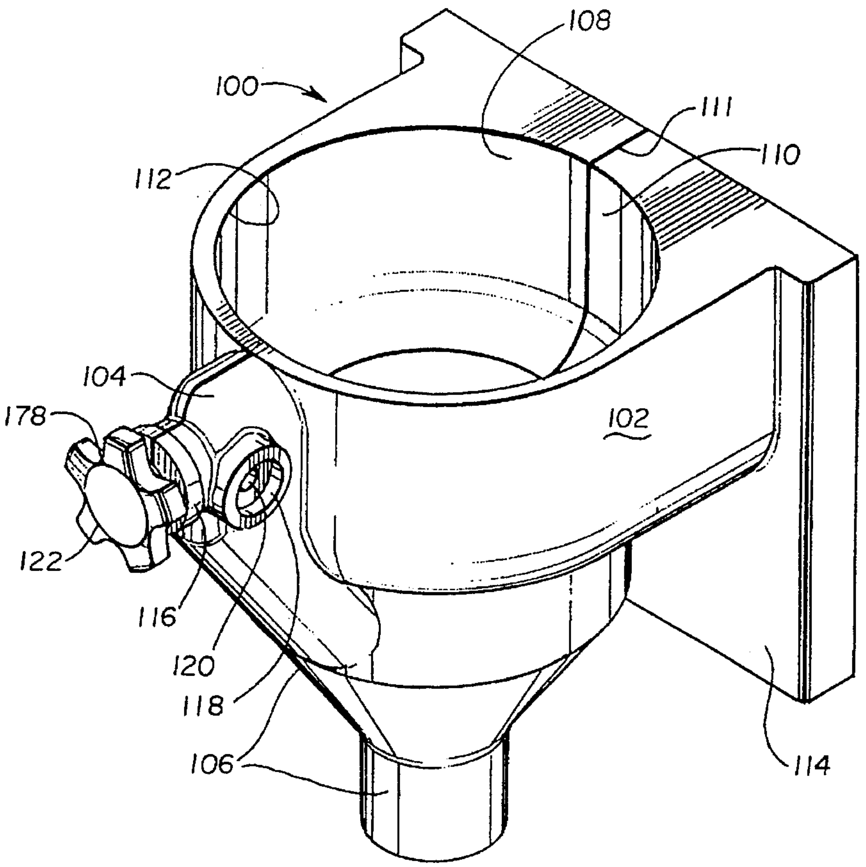
FIG. 5 is a perspective view of an alternative embodiment of the present invention.
Figure 7:
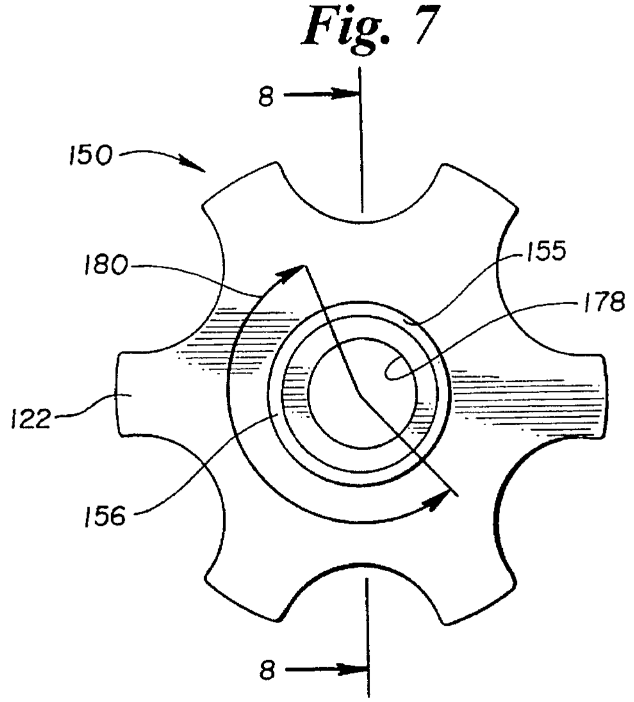
FIG. 7 is an end perspective view of the valve stem taken along line 7—7 of FIG. 8.

An alternative embodiment of the dispenser of the present invention is shown generally at 100 in FIG. 5. Dispenser 100 has three major subcomponents; unitary bowl 102, valve section 104, and fluid conduit section 106.

Dispenser 100 is preferably formed of a moldable thermo plastic material. To accommodate the ready molding of dispenser 100, dispenser 100 is molded in two halves 108, 110. The two halves 108, 110 are then brought together and bonded along line 111.

Dispenser 100 includes a detergent receptacle 112. Detergent receptacle 112 is a relatively large bowl-shaped receptacle designed to receive an inverted container of solid cast chemical, such as a detergent. Detergent receptacle 112 is designed to loosely support such chemical container therein, thereby permitting the ready replacement of such container when it has been emptied.

Dispenser 100 additionally includes backing plate 114. Backing plate 114 is designed to be conventionally affixed to the wall of the building, as by bonding to the wall surface or by the use of bolts and anchors placed in suitable bores in the wall.

Valve section 104 of dispenser 100 is molded integral with unitary bowl 102 and is formed on the front portion thereof. Valve section 104 includes valve body 116 and a valve stem, as will be later described. Rotary handle 122 is affixed to such valve stem and designed to rotate the valve stem as desired.

Valve section 104 includes water inlet 118 formed in the side of valve body 116. A water inlet passageway 120 is formed in the center of water inlet 118. Water inlet 118 is designed to be fluidly coupled to a hose (not shown) or the like. The hose is preferably connected to a source of hot water, such as the hot water outlet of a sink or the like. Water inlet 118 may also be plumbed into the source of hot water by the use of conventional plumbing conduit.

Figure 6:
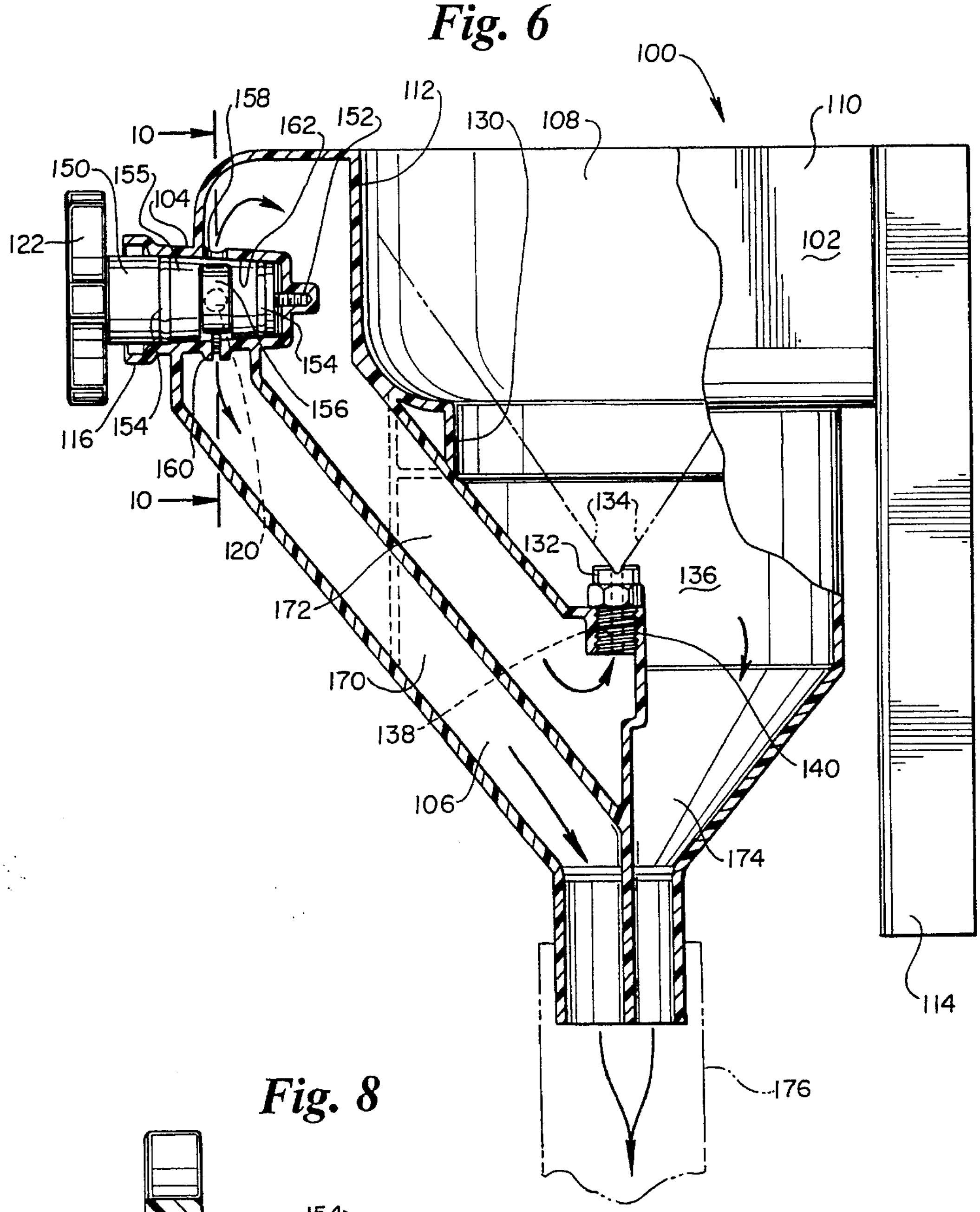
FIG. 6 is a side elevational view of the present invention as depicted in FIG. 5 with a portion of the bowl structure broken away to reveal fluid controls and paths.

Referring to FIG. 6, mouth receiver 130 is depicted at the bottom of detergent receptacle 112. Mouth receiver 130 is designed to receive and support a downwardly directed mouth of the chemical container (not shown). Since the chemical within the chemical container is solid cast it remains in the container while in the inverted position until forcibly dislodged from the container.

Upwardly directed nozzle 132 is positioned centrally and beneath mouth receiver 130. A representative water spray 134 is depicted projecting upward from nozzle 132. Water spray 134 is designed to impinge upon the solid cast chemical contained within the chemical container and dissolve the chemical, creating a concentrated chemical solution.

A concentrate collector 136 is formed beneath mouth receiver 130. Concentrate collector 136 is designed to receive the concentrated chemical solution that is dislodged from the chemical container by water spray 134. Concentrate collector 136 is designed to receive such concentrate flowing from the chemical container for further distribution.

Nozzle 132 is preferably formed of a thermo plastic material separate from bowl 102. Nozzle 132 is held in threaded engagement with bowl 102 by threads 140. A spray inlet passageway 138, depicted in phantom, conveys the upwardly directed water for water spray 134 through the nozzle body to the nozzle outlet.

Valve stem 150 is depicted rotatably mounted within valve body 116. Valve stem 150 is held in position within valve body 116 by pin 1552. Two O rings 1554 are held in compressive engagement between valve stem 1550 and valve body 116. O rings 154 are designed to contain the flow of water to the region defined between O rings 1554. The region defined between the O rings 1554 is generally tapered such that the tapered section 1555 of valve stem 150 conforms to the tapered inner face 162 of valve body 116.

A semi-circular channel 156 is defined in the tapered section 155 of valve stem 150. The space between valve body 116 and valve stem 150 that is defined by channel 156 is the fluid conveying portion of valve section 104. The O rings 154 ensure that the flow of fluid is confined to such space.

An upwardly directed nozzle flow outlet 158 is defined by a bore that extends through valve body 116. The nozzle flow outlet 158 is selectively fluidly coupled to the water inlet passageway 120 by channel 156. The bore defining the nozzle flow outlet 158 is preferably circular in cross section.

A downwardly directed dilution flow outlet 160 is preferably diametrically opposed to nozzle flow outlet 158. Dilution flow outlet 160 is preferably an arcuate slot defined in tapered interface 162. Dilution flow outlet 160 carries through the structure of valve body 116. Dilution flow outlet 160 preferably has a generally rectangular cross section, having a height dimension of between 0.03 and 0.09 inches and is preferably 0.06 inches. Dilution flow outlet 160 preferably extends through an arc of approximately 60 degrees. The extended arcuate slot that defines dilution flow outlet 160 facilitates metering a desired flow through dilution flow outlet 160.

The fluid conduit section 106 of dispenser 100 includes three distinct flow conduits defined within dispenser 100. The three flow conduits include dilution flow conduit 170, nozzle flow conduit 172, and concentrate flow conduit 174. A fourth conduit is connected to dispenser and is discharge flow conduit 176.

The dilution flow conduit 170 is fluidly coupled to the dilution flow outlet 160 at a first end. At a second end, the dilution flow conduit 170 discharges into the discharge flow conduit 176, depicted in phantom. The dilution flow conduit 170 is formed integral to bowl 102 and is defined in two halves by the bowl halves 108, 110 which are bonded together.

Discharge flow conduit 176 is typically a flexible hose that is connected to bowl 102 by a suitable compression fitting such as a hose clamp or the like. The discharge flow conduit 176 typically discharges into a receptacle (not shown) for collecting the detergent of the desired concentration. The receptacle may then be readily withdrawn from beneath the discharge flow conduit 176 by service personnel for use in cleaning activities.

Nozzle flow conduit 172 is fluidly coupled at a first end nozzle flow outlet 158. Nozzle flow conduit 172 is fluidly coupled at a second end to spray inlet passageway 138. Like the dilution flow conduit 170, the nozzle flow conduit 172 is formed integral to bowl 102 and is defined in two halves by the bowl halves 108, 110, which are bonded together. In the preferred embodiment, the dilution flow conduit 170 and the nozzle flow conduit 172 are formed adjacent to one another.

The final flow conduit is the concentrate flow conduit 174. Concentrate flow conduit 174 is fluidly coupled at a first end to concentrate collector 136. Concentrate flow conduit 174 is fluidly coupled at a second end to discharge flow conduit 176 and is designed to convey concentrated chemical solution that collects within concentrate collector 136 to discharge flow conduit 176. The concentrate flow conduit 174 is formed integral with bowl 102.

Figure 8:
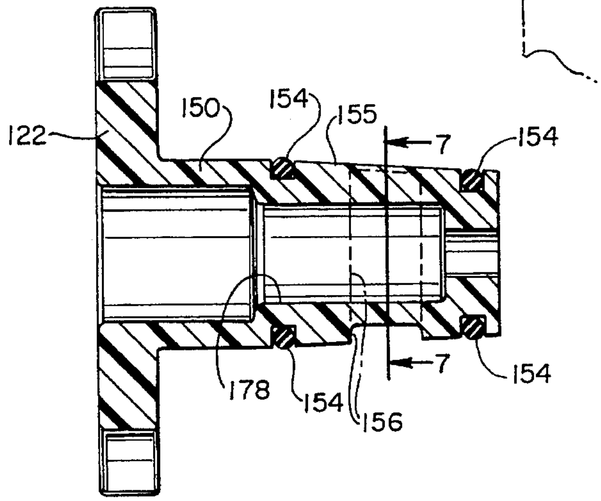
FIG. 8 is a side elevational view of the valve stem taken along line 8—8 of FIG. 3.

Referring to FIG. 8, a stem central opening 178 is depicted central to valve stem 150. Valve stem 150 is preferably formed of a thermo plastic material. Stem central opening 178 is useful in the molding and curing of valve stem 150, however, it should be noted, that stem central opening 178 plays no role in the conveyance of fluid in valve section 104.

The semi-circular channel 156 is depicted defined in tapered section 155 of valve stem 150. Channel 156 extends through an arc defined by sector 180. In a preferred embodiment, sector 180 extends through an arc of 203 degrees. The sector 180 is defined in part by the spacing of the water inlet passageway 120, the nozzle flow outlet 158 and the dilution flow outlet 160. It is desirable that channel 156 be of such sector 180 dimension as to be able to simultaneously intersect at least a portion of each of the aforementioned inlet and outlets to effect the metering of fluid thereto as desired.

In FIG. 8, the tapered section 155 of valve stem 150 is depicted extending between the two O rings 154. Semi-circular channel 156 is depicted both in section and in phantom formed in the tapered section 155 of valve stem 150. The fact that channel 156 is not indicated in the section at the top of stem 150 illustrates the semicircular nature of semi-circular channel 156.

Figure 9:
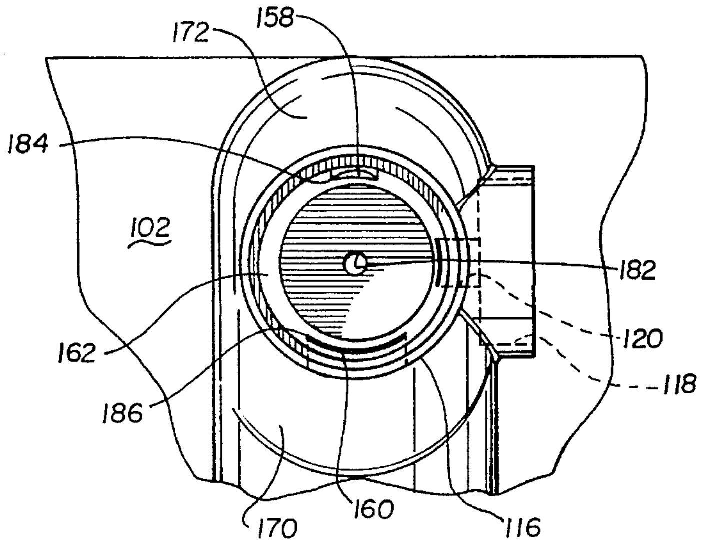
FIG. 9 is an end perspective view of the valve housing with the valve stem removed and with fluid passageways shown in phantom.

FIG. 9 depicts the valve body 116 as viewed from the front side of dispenser 100. Central in the illustration is pin receptacle 182, which is designed to mate with the pin 152 that holds valve stem 150 in place. The perspective of FIG. 9 also depicts the tapered interface 162 of valve body 116 as a narrow band extending circumferentially around the inner portion of valve body 116. Water inlet passageway 120 is depicted in phantom extending between water inlet 118 and opening into tapered interface 162. Water inlet passageway 120 is preferably circular in cross section.

Nozzle flow outlet 158 is depicted in the upper portion of tapered interface 162. Nozzle flow outlet 158 is depicted in phantom extending through valve body 116 and fluidly connected to nozzle flow conduit 172. Nozzle flow outlet 158 is preferably circular in cross section.

Dilution flow outlet 160 is depicted diametrically opposed to nozzle flow outlet 158. A portion of dilution flow outlet 160 is depicted in phantom fluidly connecting tapered interface 162 to dilution flow conduit 170. When measured in a clockwise direction, the first edge 184 of nozzle flow outlet 158 is approximately 230 degrees to first edge 186 of dilution flow outlet 160. Accordingly, with the preferred 203 degree sector 180 of semi-circular channel 156, channel 156 is not capable of fully exposing both nozzle flow outlet 158 and dilution flow outlet 160 simultaneously. This condition is more apparent with reference to FIGS. 10, 11 and 12.

Figure 10:
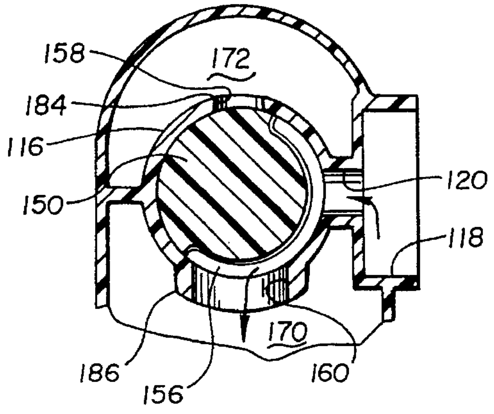
FIG. 10 is a sectional view of the valve housing end of the stem taken along line 10—10 of FIG. 6.

Referring to FIGS. 10 and 6, the configuration of valve stem 150 with respect to valve body 116 illustrates that semi-circular channel 156 is so positioned as to fully expose dilution flow outlet 160 and at the same time not expose any portion of nozzle flow outlet 158. Accordingly, flow delivered to water inlet 118 passes through water inlet passageway 120 and flows into semi-circular channel 156. Since nozzle flow outlet 158 is blocked off, all such water flow passes through channel 156, through dilution flow outlet 160, and into dilution flow conduit 170. Such flow then passes into discharge flow conduit 176. In operation, such flow would typically be used to flush discharge flow conduit 176.

Figure 11:
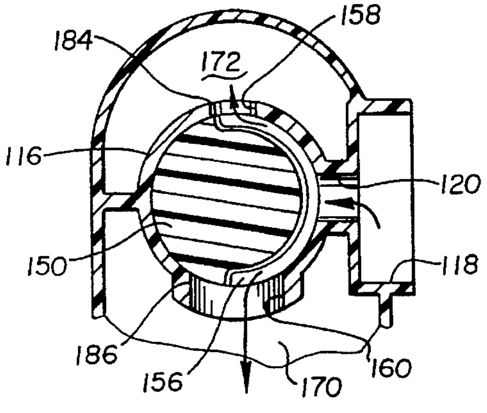
FIG. 11 is a sectional view similar to that of FIG. 10 with the exception that the valve stem has been rotated to a position permitting flow to the nozzle flow outlet and the dilution flow outlet.

Referring to FIG. 11 and again to FIG. 6, the position of valve stem 150 has been shifted with respect to valve body 116 as depicted in FIG. 10. Such shifting is accomplished by rotating the rotary handle 122 in a clockwise direction as depicted in FIG. 11. In the depiction of FIG. 11, semi-circular channel 156 has been shifted such that channel 156 is generally aligned with first edge 184 of nozzle flow outlet 158. This position fully exposes nozzle flow outlet 158. The other end of channel 156 is positioned approximately mid-way across dilution flow outlet 160.

To achieve a metering effect, valve stem 150 can be rotated counterclockwise from the position depicted in FIG. 11. Such rotation moves the leading edge of channel 156 past first edge 184 of nozzle flow outlet 158. Such movement does not effect the amount of nozzle flow outlet 158 that is exposed. However, such movement moves the trailing edge of channel 156 in a counter clockwise direction, closing off an increasing amount of dilution flow outlet 160. Thus, such motion does not effect the flow through nozzle flow outlet 158, but does gradually diminish the flow through dilution flow outlet 160. Gradually decreasing the amount of flow through dilution of flow outlet 160 diminishes the amount of flow available to dilute the concentrate flowing in concentrate flow conduit 174.

The aforementioned reduced dilution occurs as follows. Water flows into water inlet passageway 120 and is split at semi-circular channel 156, flowing to both nozzle flow outlet 158 and dilution flow outlet 160. The flow through nozzle flow outlet 158 flows into nozzle flow conduit 172. Such flow descends in nozzle flow conduit 172 and flows upward through spray inlet passageway 138 to nozzle 132. The water spray 134 from nozzle 132 is directed onto the solid cast chemical contained within the container residing in detergent receptacle 112. A flow of concentrated chemical solution descends into concentrate collector 136 and flows through concentrate flow conduit 174 to discharge flow conduit 176.

A portion of the split flow flows through semi-circular channel 156 and flows out of dilution flow outlet 160, through dilution flow conduit 170, and into discharge flow conduit 176. Such diluting flow mixes with the concentrate flowing in discharge flow conduit 176, creating a diluted solution as desired. By metering less water through dilution flow outlet 160, less water is available to dilute the concentrate flowing in discharge flow conduit 176. Accordingly, a relatively stronger concentration of the chemical solution is delivered to the solution receptacle for use by service personnel.

Figure 12:
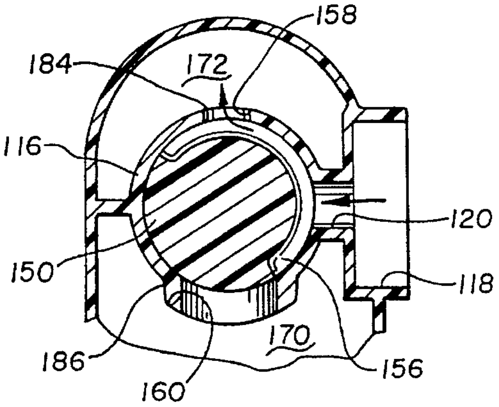
FIG. 12 is a sectional view similar to the sectional views of FIGS. 10 and 11 with the exception that the valve stem has been rotated to permit flow only to the nozzle flow outlet.

Referring to FIGS. 12 and 6, valve stem 150 is depicted as having been rotated further in a clockwise direction from the position in which valve stem 150 is depicted in FIG. 11. The depiction of FIG. 12 shows the trailing edge of channel 156 no longer in registry with the dilution flow outlet 160. Nozzle flow outlet 158 is fully exposed by channel 156. Accordingly, flow through water inlet passageway 120 is diverted upward through channel 156 and out nozzle flow outlet 158. No flow passes through dilution flow outlet 160. The flow from nozzle flow outlet 158 enters nozzle flow conduit 172 and generates water spray 134 as previously described. In the configuration depicted in FIG. 12, only a concentrated chemical solution is provided to discharge flow conduit 176, as no diluting flow is permitted in dilution flow conduit 170.

There is a range of ratios of the area of nozzle 132 to the area of the dilution flow outlet 160 which will provide satisfactory performance. It has been shown that satisfactory performance occurs when the ratio of nozzle 132 area to the dilution flow outlet 160 area is between 36:1 and 1:36. There is a bias that places optimum performance in the range of such ratio that exists between a ratio of 1:1 and 1:36.

Figure 13:
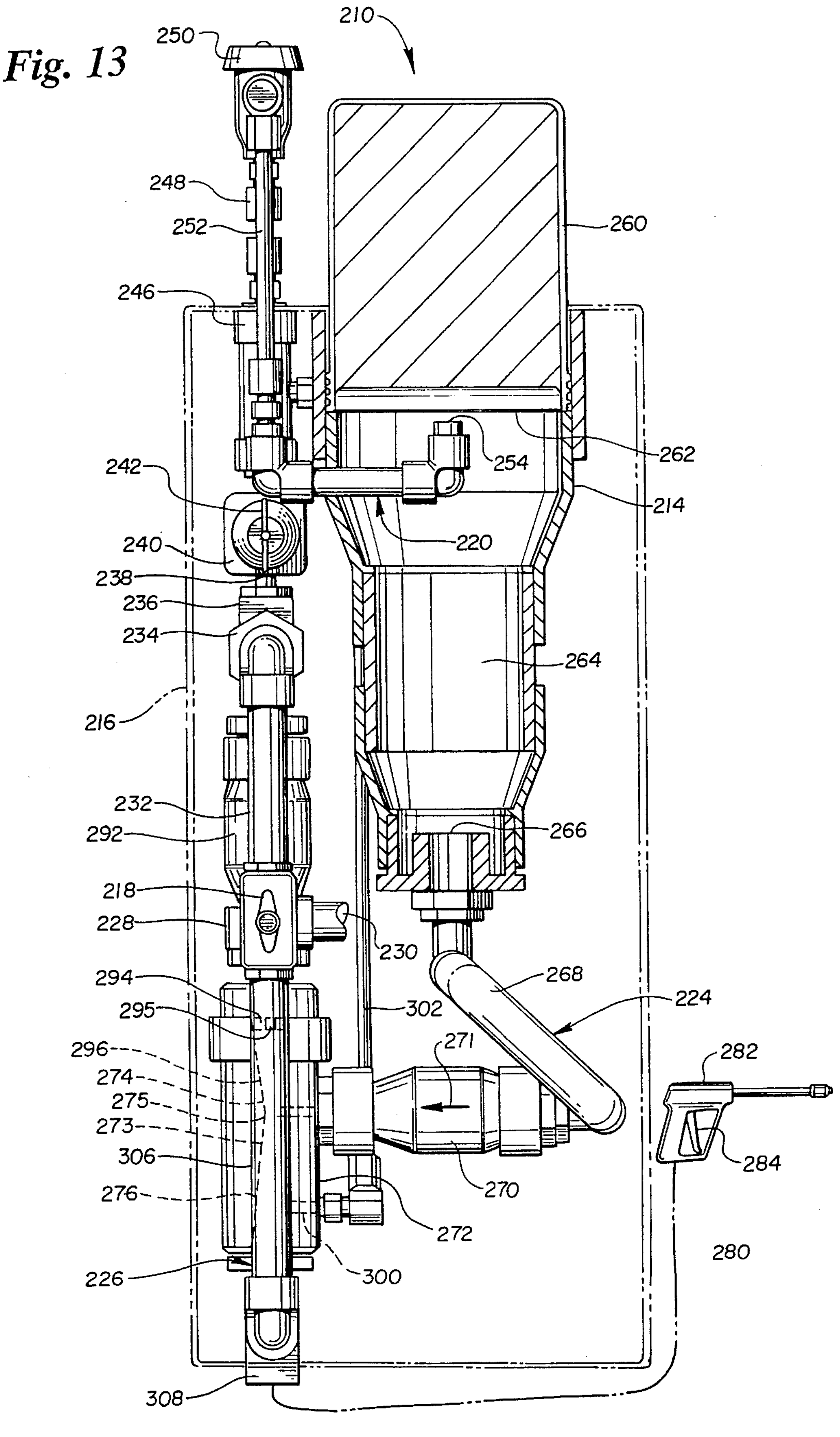
FIG. 13 is a front elevational view of the present invention incorporating the back pressure actuation feature in which certain portions of the depiction are sectioned.
Figure 14:
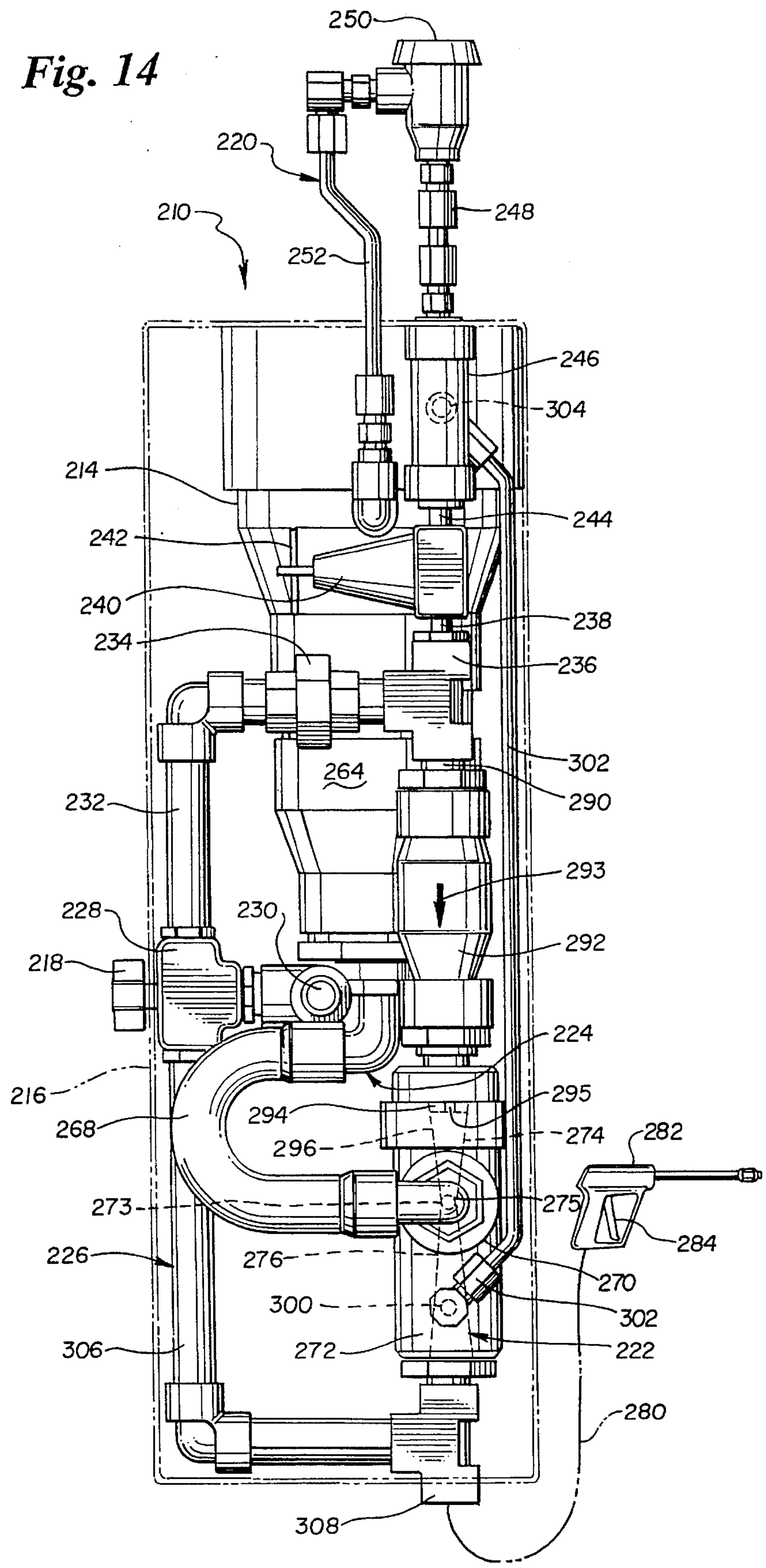
FIG. 14 is a side elevational view of the present invention incorporating the back pressure actuation feature in which certain portions of the depiction are sectioned.

The further embodiment of the present invention is depicted in FIGS. 13–16. FIGS. 13 and 14 depict a detergent dispenser generally at 210. Detergent dispenser 210 has major subcomponents consisting of dispenser bowl 214 and associated plumbing, as will be described. Dispenser bowl 214 is preferably formed of a thermoplastic material. Dispenser bowl 214 is disposed within a metallic housing 216. Housing 216 is designed to be conventionally mounted on the wall of a facility to be cleaned. A valve handle 218 projects through housing 216 and is available for rotation by an operator in order to control detergent solution flow.

The plumbing associated with dispenser bowl 214 is comprised generally of nozzle fluid path 220, venturi fluid path 222, concentrate fluid path 224, and rinse fluid path 226. Flow in the plumbing commences at three-way valve 228. Three-way valve 228 is controlled by valve handle 218. Three-way valve 228 is fluidly coupled to a water inlet 230. Water inlet 230 is typically fluidly coupled by a hose 329, depicted schematically in FIG. 16, or the like to a source of hot water. In typical usage, such hose is typically coupled by a union to the hot water spigot 331 of a nearby sink, depicted schematically in FIG. 16.

The nozzle fluid path 220 commences at three-way valve 228 and progresses through uptake conduit 232. Conduit 232 may have a union 234 incorporated therein for ease of assembly. Uptake conduit 232 is fluidly coupled to T-fitting 236. The T-fitting 236 provides for the splitting of the water flow thereto in upward and downward directions, as depicted in FIGS. 13 and 14. The nozzle fluid path 220 continues in the upward direction through conduit 238 to pressure reducer valve 240.

Pressure reducer valve 240 includes a handle 242 by which the amount of pressure reduction caused by pressure reducer valve 240 may be manually set. In the preferred embodiment, the pressure of the water at the outlet of pressure reducer valve 240 is preferably 20 pounds per square inch less than the pressure of the water entering pressure reducer valve 240. In all cases, it is important that the pressure of the water leaving pressure reducer valve 240 be less than the pressure of the water entering pressure reducer valve 240.

Figure 15:
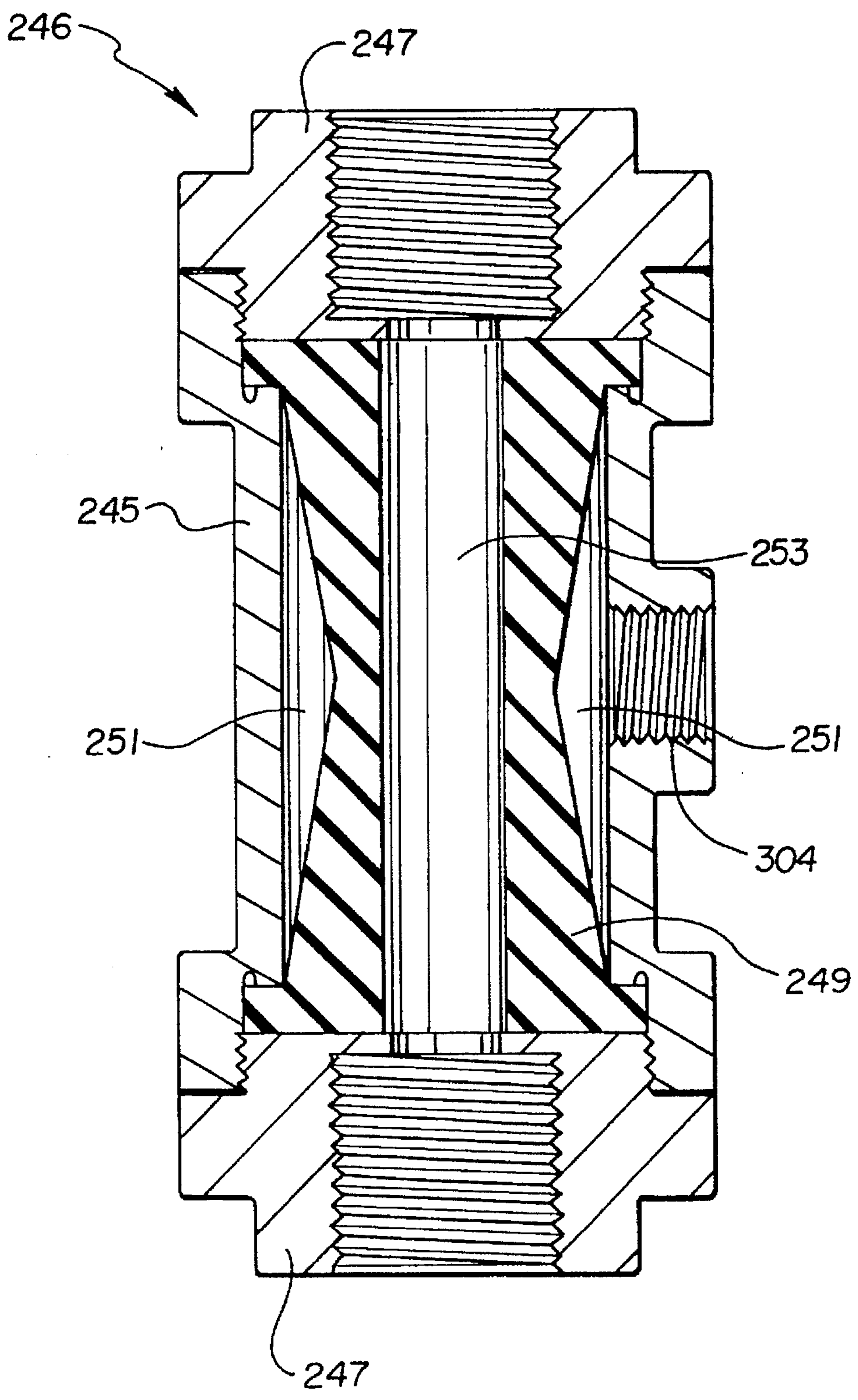
FIG. 15 is a cross sectioned side elevational view of a back pressure activated valve suited for use with the present invention.

The reduced pressure water flow is conveyed via conduit 244 to back pressure activated valve 246. A variety of pressure actuated valves are known to be available to perform the function of back pressure activated valve 246. A valve that is particularly adapted for such use is the Airpinch™ air-actuated pinch valve available from Richway Industries, Ltd., 525 Main St., Janesville, Iowa 50647. Such a back pressure activated valve 246 is depicted in FIG. 15. Valve 246 has a valve body 245 that is preferably formed of a rigid thermoplastic material. A connector 247 is provided at each end of valve body 245. In the present application, one connector 247 is connected to conduit 244 and the other connector 247 is connected to conduit 248. A rubber sleeve 249 is disposed within valve body 245. The diameter of rubber sleeve 249 is reduced proximate the center of sleeve 249, defining a fluid compression space 251 between the center portion of rubber sleeve 249 and the inner surface of valve body 245. The back pressure inlet 304 is fluidly coupled to the fluid compression space 251. A longitudinal bore 253 is defined within rubber sleeve 249. The longitudinal bore 253 fluidly connects conduit 244 to conduit 248.

The reduced pressure water flow continues from back pressure activated valve 246 through conduit 248 to vacuum preventer 250. The vacuum preventer 250 is a conventional unit typically incorporated at the high point of the plumbing to prevent the formation of a vacuum therein, which would impede flow in nozzle fluid path 220. The outlet of vacuum preventer 250 is coupled to conduit 252. Conduit 252 conveys the reduced pressure water flow to nozzle 254.

Figure 16:
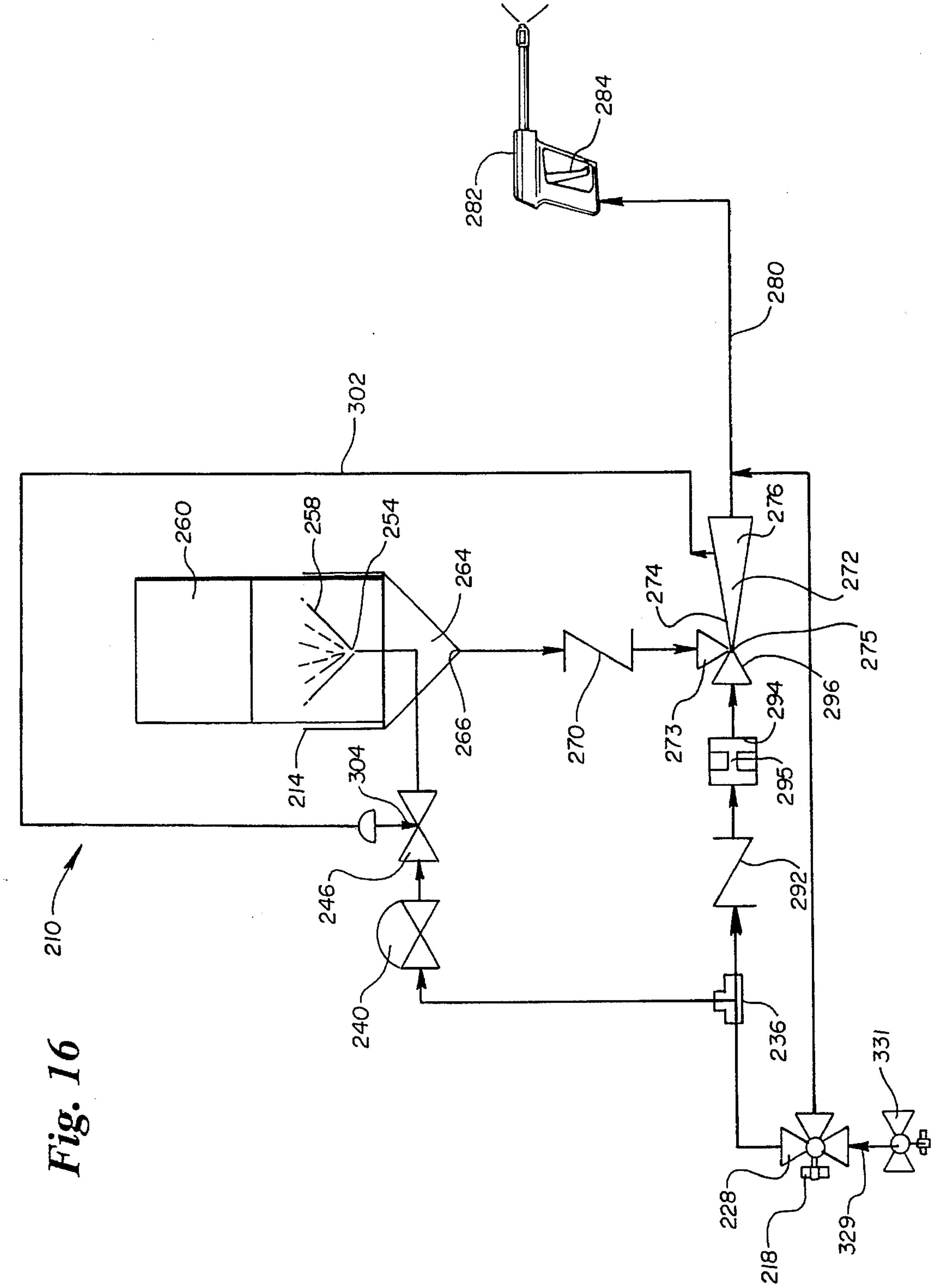
FIG. 16 is a functional schematic representation of the present invention incorporating the back pressure actuation feature.

Nozzle 254 is so oriented as to direct the water spray 258 in an upward direction as depicted in FIGS. 13, 14 and 16. A concentrate container 260 containing the solid cast detergent is positioned in an inverted orientation within dispenser bowl 214. Concentrate container 260 typically has a relatively large diameter mouth 262. As concentrate container 260 is disposed within dispenser bowl 214, mouth 262 is positioned slightly above nozzle 254. Water spray 258 emanating from nozzle 254 enters mouth 262 and bears upon the solid cast detergent dissolves the concentrated detergent to form a fluid detergent concentrate.

The concentrate fluid path 224 commences with the dissolution of the concentrated detergent contained within concentrate container 260. The concentrated detergent fluid flows downward through accumulator 264 that forms the bottom portion of dispenser bowl 214. The concentrated detergent is channeled to flow out of discharge port 266 located at the lower portion of accumulator 264.

Discharge port 266 is coupled by conduit 268 to check valve 270. Flow in check valve 270 is as indicated by arrow 271. Check valve 270 is designed to prevent any fluid flow in the direction opposite to arrow 271 in order to prevent backups into accumulator 264.

Check valve 270 is fluidly coupled to venturi 272. Concentrate flowing from check valve 270 enters concentrate passageway 273 defined within venturi 272. The concentrate passageway 273 intersects the flow passageway 274 defined within venturi 272 proximate throat 275 thereof. The detergent concentrate introduced to venturi 272 via concentrate passageway 273 continues out the expanding discharge portion 276 of flow passageway 274.

The discharge of venturi 272 is fluidly coupled to T-fitting 308. T-fitting 308 is fluidly coupled to hose 280, depicted schematically in FIG. 13. Hose 280 is typically a relatively long, flexible, garden-type hose that permits an operator a relatively large degree of freedom to move about the facility being cleaned and to spray down the various surfaces thereof. Hose 280 is fluidly coupled to detergent solution nozzle 282. Detergent solution nozzle 282 is selectively activated by an operator via trigger 284. In performing a cleansing operation, the operator frequently activates trigger 284 to turn on and turn off the detergent solution spray emanating detergent solution nozzle 282.

The venturi fluid path 222 commences at T-fitting 236. The downward water flow through T-fitting 236 is conveyed via conduit 290 to check valve 292. Check valve 292 permits fluid flow only in the direction of arrow 293. Check valve 292 is fluidly coupled to venturi 272. As water flow enters venturi 272 it is met by fixed restriction 294. Fixed restriction 294 in conjunction with pressure reducer valve 240 fixes the water flow volumes in both the nozzle fluid path 220 and the venturi fluid path 222, thereby establishing the flow split that occurs in T-fitting 236. Fixed restriction 294 is preferably a circular fixture installed within flow passageway 274. Fixed restriction 294 has an orifice 295 of fixed area. Fixed restriction 294 may be readily replaced with an alternative fixed restriction 294 having a lesser or greater area of orifice 295 as desired. Such interchange of fixed restrictions 294 will affect the aforementioned flow split in T-fitting 236.

The water flows through contracting inlet portion 296 of flow passageway 274 to throat 275. At throat 275, the flow is merged with the detergent concentrate flow entering venturi 272 through concentrate passageway 273. The concentrate flow, now diluted by the merging flow of water, flows to hose 280. The water flow through contracting inlet portion 296 creates a negative pressure acts to draw the detergent concentrate flow into the throat 275.

A back pressure outlet 300 is fluidly coupled to the expanding discharge portion 276 of flow passageway 274. Back pressure outlet 300 is coupled to conduit 302. Conduit 302 is fluidly coupled to back pressure inlet 304 of back pressure activated valve 246.

The rinse fluid path 226 commences at three-way valve 228. The operator may select the rinse function by rotation of handle 218. Such rotation diverts all incoming water to the rinse fluid path 226. A conduit 306 is fluidly coupled to three-way valve 228 and to T-fitting 308 and conveys the rinse water. The rinse water flow is from T-fitting 308 through hose 280 to flush the detergent solution from hose 280 and detergent solution nozzle 282.

The operation of the present invention is best understood by reference to FIG. 16. In order to wash down an area such as the floor and working surfaces in a meat processing facility, for example, the operator first turns on the hot water at spigot 331 to enable the flow of hot water to detergent dispenser 210. No such flow is initiated until activation of trigger 284 of detergent solution nozzle 282. The various flows that are subsequently described presume activation of trigger 284 by an operator.

The hot water flows through hose 229 to three way valve 228. The operator selects the "soap" position marked on the label affixed to housing 216 by rotation of handle 218. Such rotation of handle 218 configures three way valve 228 to divert all of the incoming hot water flow to T-fitting 236. The water flow is split at T-fitting 236, with a first portion of such flow going to pressure reduction valve 240. Pressure reduction valve 240 acts on the water flow to reduce the pressure of such flow from the incoming line pressure to an amount that is preferably 20 pounds per square inch less than the incoming line pressure. The amount of pressure reduction is dictated by the actuation requirements of the back pressure activated valve 246 and may be in the range of five pounds per square inch to thirty pounds per square inch. This reduced pressure flow then flows to back pressure activated valve 246.

The water flows through back pressure activated valve 246 to nozzle 254. The water spray 258 from nozzle 254 bears on the detergent concentrate in concentrate container 260 generating a flow fluid detergent concentrate.

The flow of fluid detergent concentrate is through discharge port 266, check valve 270 and into venturi 272.

The second portion of water flow from T-fitting 236 passes through check valve 292 through fixed restriction 294 and into the contracting inlet portion 296 of flow passageway 275 defined in venturi 272. Water flow through throat 274 generates a pressure reduction that draws the fluid detergent concentrate in through concentrate passageway 273 and mixes therewith.

The now-diluted fluid detergent concentrate flows outward through the expanding discharge portion 275 of flow passageway 274. Such flow proceeds through hose 280 to detergent solution nozzle 282. Activation of trigger 284 of detergent solution nozzle 282 results in the previously described flows through detergent dispenser 210 being initiated. Conditions within detergent dispenser 210 are static until such initiation.

Deactivation of trigger 284 causes the previously described flow of detergent solution to cease. In order to ensure that the fluid concentrate in dispenser bowl 214 does not overflow, it is important that flow to nozzle 254 be terminated virtually simultaneously with the deactivation of trigger 284. Such deactivation must be effected by mechanical as distinct from electrical means for operator safety.

Flow to nozzle 254 is caused to cease by means of the following sequence of events. Deactivation of trigger 284 causes a back pressure in hose 280 that passes into the expanding discharge portion 276 of flow passageway 274. The back pressure passes through back pressure outlet 300 and travels through conduit 302 to back pressure inlet 304 of back pressure actuator valve 246. The back pressure enters compression space 251 surrounding the center portion of rubber sleeve 249. Since the back pressure exceeds the pressure of the fluid flowing in the longitudinal bore 253 of rubber sleeve 249, the back pressure acts to collapse the center portion of rubber sleeve 249 inward, closing off longitudinal bore 253 and halting the flow of fluid therethrough. This back pressure is felt at back pressure activated valve 246 virtually simultaneously with deactivation of trigger 284.

The activation of back pressure actuated valve 246 is caused by an activating pressure a back pressure inlet 304 that is greater than the line pressure of the water flow into back pressure actuator valve 246. The back pressure in the present case is equal to the pressure in the hose 329 from spigot 331, whereas the pressure of the flow into back pressure actuator valve 246 is a preferably 20 pounds per square inch less than the line pressure. As previously indicated, this 20 Psi spout drop occurs in pressure reduction valve 240. Accordingly, the back pressure at back pressure inlet 304 of back pressure actuator valve 246 turns off the valve and prevents further water flow to nozzle 254.

After completing a wash down with the detergent solution, the operator may desire to rinse away any detergent remaining in the cleaned area. During a rinse cycle, the operator selects the rinse position with handle 218. This configures three way valve 228 to divert all flow through conduit 306 to T-fitting 278. Such flow then passes through hose 280 to detergent nozzle 282. Such flow will flush the detergent solution from hose 280 and detergent solution nozzle 282 and rinse the previously cleaned area.

What is claimed is:

1. An improved detergent dispenser coupled to a source of fluid and having a chemical source being in solid cast form, a spray generator designed to generate a fluid spray bearing on the chemical source, the fluid spray generating a concentrated solution of the chemical, the concentrated solution of the chemical being discharged through a discharge conduit, wherein the improvement comprises:

a single valve means for controlling a flow of fluid from the source of fluid, having an inlet being operably fluidly coupled to the source of fluid, having a first outlet operably fluidly coupled to the spray generator, and having a second outlet operably fluidly coupled to the discharge conduit; and metering means for selectively metering portions of the flow of fluid from the source of fluid to the spray generator and to the discharge conduit, said metering means being disposed within the valve means and selectively fluidly coupling said inlet to said first outlet and selectively fluidly coupling said inlet to said second outlet.

2. An improved detergent dispenser as claimed in claim 1, the valve means having a cylindrical valve body defining a valve stem cavity and having a fluid inlet and the first and second fluid outlets defined therethrough and opening into said valve stem cavity and the metering means being a valve stem having an exterior surface rotatably engaged within said valve stem cavity and having a semi-circular fluid channel defined in said exterior surface, wherein rotation of the valve stem within the valve body selectively brings said fluid channel into registry with the fluid inlet and the first and second fluid outlets defined in the valve body, thereby opening and closing said fluid inlet and fluid outlets as desired.

3. An improved detergent dispenser as claimed in claim 2 wherein the fluid inlet and the the first and second fluid outlets are arrayed to span a certain arc path about the cylindrical valve body and the semi-circular fluid channel defined in the exterior surface of the valve stem subtends an arc that is less than the certain arc spanned by the array of the fluid inlet and the the first and second fluid outlets.

4. An improved detergent dispenser as claimed in claim 3 wherein the fluid inlet is disposed on the arc path between said first fluid outlet and said second fluid outlet.

5. An improved detergent dispenser as claimed in claim 4 wherein at least one of the first and second fluid outlets is formed by structure defining a slot that subtends a certain arc about the cylindrical valve body, the slot having a substantially rectangular cross section.

6. An improved detergent dispenser coupled to a source of fluid and having a chemical source being in solid cast form, a spray generator designed to generate a fluid spray bearing on the chemical source, the fluid spray generating a concentrated solution of the chemical, the concentrated solution of the chemical being discharged through a discharge conduit, wherein the improvement comprises:

a valve for controlling the flow of a fluid from a fluid inlet to a first and a second valve outlet, the fluid inlet being in flow communication with the source of fluid and having a cylindrical valve body and a valve stem disposed therein, the cylindrical valve body defining a valve stem cavity and having the fluid inlet and the first and the second fluid outlets defined therethrough and opening into said valve stem cavity; and the valve stem having an exterior surface rotatably engaged within said valve stem cavity and having a semi circular fluid channel defined in said exterior surface, wherein rotation of the valve stem within the valve body selectively brings said fluid channel into registry with the fluid inlet and fluid outlets defined in the valve body, thereby opening and closing said fluid inlet and fluid outlets as desired.

7. An improved detergent dispenser as claimed in claim 6 further including the spray generator having a nozzle orifice, the first fluid outlet being in flow communication with the nozzle orifice, and having a dilution conduit fluidly coupling the second outlet to the discharge conduit wherein the ratio of the area of the nozzle orifice to the second outlet is between 36:1 and 1:36.

8. An improved detergent dispenser as claimed in claim 7, wherein the ratio of the area of the nozzle orifice to the second outlet is between 1:1 and 1:36.

* * * * *

UNITED STATES PATENT AND TRADEMARK OFFICE
CERTIFICATE OF CORRECTION

PATENT NO. : 5,478,537

DATED : December 26, 1995

INVENTOR(S) : Timothy E. Laughlin, et al.

It is certified that error appears in the above-indentified patent and that said Letters Patent is hereby corrected as shown below:

Col. 2, line 29, delete "hose", and insert therefor --hose.--; also delete "the", and insert therefor --The--.

Col. 15, line 13, delete the first occurrence of the word "the".

Col. 15, line 8, delete the first occurrence of the word "the".

Col. 1, line 14, delete "5,342,487", and insert therefor --5,342,587--.

Col. 2, line 26, after "cleansing", insert --of--.

Col. 3, line 52, delete "22", and insert therefor --2-2--.

Col. 7, line 61, delete "1552", and insert therefor --152--; also delete "1554", and insert therefor --154--.

Col. 7, line 62, delete "1550", and insert therefor --150--.

Col. 7, line 64, delete "1554", and insert therefor --154--.

Col. 7, line 65, delete "1554", and insert therefor --154--.

Col. 7, line 66, delete "1555', and insert therefor --155--.

UNITED STATES PATENT AND TRADEMARK OFFICE

CERTIFICATE OF CORRECTION

PATENT NO. : 5,478,537

DATED : December 26, 1995

INVENTOR(S) : Timothy E. Laughlin, et al.

It is certified that error appears in the above-indentified patent and that said Letters Patent is hereby corrected as shown below:

Col. 11, line 35, do not bold "20".

Col. 13, line 49, delete "275", and insert therefor --274--.

Col. 13, line 50, delete "274", and insert therefor --275--.

Col. 13, line 54, delete "275", and insert therefor --276--.

Signed and Sealed this

Third Day of September, 1996

Attest:

BRUCE LEHMAN

*Attesting Officer*

*Commissioner of Patents and Trademarks*